United States Patent
Zitelli

(10) Patent No.: US 7,398,022 B2
(45) Date of Patent: Jul. 8, 2008

(54) OPTICAL RETURN-TO-ZERO PHASE-SHIFT KEYING WITH IMPROVED TRANSMITTERS

(75) Inventor: Mario Zitelli, Via Enrico Fermi, 130, Rome (IT) 00146

(73) Assignee: Mario Zitelli, Rome (IT)

( * ) Notice: Subject to any disclaimer, the term of this patent is extended or adjusted under 35 U.S.C. 154(b) by 488 days.

(21) Appl. No.: 11/176,333

(22) Filed: Jul. 8, 2005

(65) Prior Publication Data

US 2007/0009269 A1   Jan. 11, 2007

(51) Int. Cl.
*H04B 10/04* (2006.01)

(52) U.S. Cl. .................. 398/183; 398/182; 398/184; 398/185; 398/186; 398/187; 398/188; 398/189; 398/192; 398/193; 398/194; 398/196; 398/197; 398/198; 398/200; 398/201; 398/141; 398/154; 398/155; 398/158; 398/159

(58) Field of Classification Search ............... 398/182, 398/183, 184, 185, 186, 187, 188, 189, 192, 398/193, 194, 196, 197, 198, 200, 201, 154, 398/155, 158, 159, 141
See application file for complete search history.

(56) References Cited

U.S. PATENT DOCUMENTS 7,116,917 B2 * 10/2006 Miyamoto et al. ........... 398/185
7,206,519 B2 *  4/2007 Lee et al. .................... 398/186

* cited by examiner

*Primary Examiner*—Hanh Phan

(57) ABSTRACT

An apparatus and a method for transmitting at least a digital optical signal with return-to-zero phase-shift keying, employing a single optical modulator with dual-drive design, the encoded optical signal having improved spectral efficiency and performances and being generated by transmitters with simplified scheme; an optical communication system comprising the transmitting apparatus, a transmission line and an apparatus to receive the optical signal.

23 Claims, 7 Drawing Sheets a)

b)

OPTICAL RETURN-TO-ZERO PHASE-SHIFT KEYING WITH IMPROVED TRANSMITTERS

FIELD OF THE INVENTION

The invention relates to the transmission of optical signals in optical fiber communication systems, and more particularly to new devices and methods for modulating an optical carrier with improved performances and with a simplified scheme for the optical transmitter.

BACKGROUND OF THE INVENTION

Advanced optical modulation formats are commonly referred to signals alternative to the common Non-Return-to-Zero (NRZ) and Return-to-Zero (RZ), offering improved performances and tolerances to optical linear and nonlinear physical effects. The binary NRZ format consists in transmitting a first of the two logical states (for example the 1) through a substantially constant optical signal over the whole bit time slot $T_B$, and the second of the two logical states (for example the 0) through a reduced or absent optical power over the whole bit slot. In the common RZ modulation format, one of the two logical states corresponds to the presence of an optical pulse with proper optical power and duration shorter than the bit period $T_B$, the second of the two logical states corresponds to the absence of pulses, or to a pulse with reduced power.

Key features for the success of advanced modulation technologies are the tolerances to linear and to nonlinear optical effects, the receiver sensitivity, the reachable signal extinction ratio, the number of modulators required at the transmitter, the electronics bandwidth as well as the maximum spectral efficiency in the wavelength division multiplexing (WDM) transmission. Local area optical networks (LAN) and metropolitan area networks (MAN) require modulation formats with large tolerances to chromatic dispersion, and low-cost transmitter/receiver devices.

Next generation WDM channels are planned to transmit at bit rates of R=40, 80 and 160 Gbit/s; the feasibility of commercial NRZ or RZ transmitters at those bit rates is not obvious, because the required bandwidth for the electronics and opto-electronics is comparable to R. The development of stable 40 GHz electronics has emerged in the last few years, and is still characterized by high production costs, while the development of electronics with cut-off frequency approaching to 80 or 160 GHz is still far to come.

In the last years, optical phase-shift keying (PSK) has been proposed for improving the tolerances to Kerr nonlinearity, optical signal-to-noise ratio (OSNR), WDM channel spacing and to chromatic dispersion. Optical phase is commonly modulated using a 2-level differential signal (DPSK), 4-level pre-encoded signal (DQPSK) or M-ary signal. Return-to-Zero Phase-Shift Keying (RZ-PSK) is characterized by the phase modulation of a train of optical pulses. In the common RZ-DPSK format, one of the two logical states corresponds to the presence of an optical pulse with arbitrary optical phase $\phi_0$ (rad), the second of the two logical states corresponds to a pulse with optical phase $\phi_0+\pi$. In the RZ-DQPSK format, two bits are contemporarily transmitted at each baud slot $T_B$; one of the corresponding four logical states corresponds to the presence of an optical pulse with arbitrary optical phase $\phi_0$ (rad), the other logical states correspond to pulses with optical phase $\phi_0+\pi/2$, $\phi_0+\pi$ and $\phi_0+3\pi/2$. The RZ power shaping advantageously eliminates the patterning effects due to the phase modulation, by reducing the optical power in correspondence of the phase transitions.

Differential quadrature phase-shift keying (DQPSK and RZ-DQPSK) has revealed one of the most promising modulation formats for metropolitan and long-haul applications; the transmission of a multi-level signal permits to reduce the transmitter/receiver electrical and optical bandwidth, as well as the optical pulse repetition rate, increasing the tolerances to chromatic dispersion. Paper [R. A. Griffin, A. C. Carter, "Optical differential quadrature phase-shift key (oDQPSK) for high capacity optical transmission", OFC '02, vol. WX6, 2002] introduces a new DQPSK transmitter scheme based on a Mach-Zehnder super-structure, including 2 phase modulators; a further external intensity shaper modulator may be added to the proposed transmitter to generate a RZ-DQPSK optical signal. Patent application publication no. US 2005/0074245 A1, by R. Griffin, describes the above DQPSK transmitter with Mach-Zehnder super-structure. Paper [P. S. Cho, G. Harston, C. J. Kerr, A. S. Greenblatt, A. Kaplan, Y. Achiam, G. Levy-Yurista, M. Margalit, Y. Gross, J. B. Khurgin, "Investigation of 2-b/s/Hz 40-Gb/s DWDM transmission over 4×100 km SMF-28 fiber using RZ-DQPSK and polarization multiplexing", IEEE Photonics Technology Letters, vol. 16, pp. 656-659, Feburary 2004] investigates experimentally the use of polarization-time interleaving with RZ-DQPSK signals; RZ-DQPSK was generated using an intensity shaper modulator, and two Lithium Niobate Mach-Zehnder modulators in push-pull configuration, biased at the minimum transmission point. Paper [K. P. Ho, H. W. Cuei, "Generation of arbitrary quadrature signals using one dual-drive modulator", J. of Lightwave Technology, vol. 23, pp. 764-770, February 2005] proposes the generation of NRZ QAM and QPSK optical signals using a single dual-drive Mach-Zehnder modulator. RZ-DQPSK is produced by an intensity shaper modulator cascaded to a dual-drive modulator biased at the minimum transmission point. Paper [M. Ohm, T. Freckmann, "Comparison of different DQPSK transmitters with NRZ and RZ impulse shaping", proc. of LEOS '04, vol. ThB2, 2004] investigates numerically three DQPSK transmitter schemes with NRZ optical power; one of the 3 transmitters employs a single phase modulator driven by a 4-level electrical signal. No RZ amplitude shaping is investigated. Patent no. U.S. Pat. No. 6,798,557 B1, by A. Leven, introduces a binary phase modulator with arbitrary phase shift, employing a Mach-Zehnder super-structure with a single phase modulator. The device is suitable to be cascaded with other Mach-Zehnder super-structures to generate a M-ary phase-modulated optical signal. RZ pulse shaping may be added using a further external shaper modulator. Patent no. U.S. Pat. No. 6,271,950 B1, by P. B. Hansen and T. N. Nielsen, describes an optical transmitter with N cascaded phase modulators, suitable for the time division multiplexing (TDM) of N DPSK tributaries.

The modulation formats and transmitter/receiver schemes proposed above require one or two optical phase modulators to generate a DQPSK optical signal, and one to $n=\log_2 M$ phase modulators for a M-ary signal. For all the transmitter schemes presented in the prior art, a further optical intensity modulator is required to shape the optical pulses in the form of a pulse train (RZ-DPSK, RZ-DQPSK etc.). The complexity of the proposed transmitters, and the high costs for each optical modulator reduce their applicability to metropolitan and local area networks, where cost-effective devices are a primary requisite.

BRIEF SUMMARY OF THE INVENTION

The invention relates to an optical communication system in which at least one digital optical signal is transmitted with return-to-zero phase-shift keying format (RZ-PSK), using a single optical modulator for a simultaneous modulation of the amplitude and the phase.

The basic idea in one aspect of the present invention is using a single Mach-Zehnder optical modulator with dual-drive design for generating a train of optical pulses with baud rate $R=1/T_B$, and contemporarily for modulating the optical phase with a M-ary signal at same baud rate R (or symbol rate).

The idea in a second aspect of the invention is using a single Mach-Zender modulator with dual-drive design for modulating both the amplitude and the phase of a substantially continuous flow of optical radiation, for generating a RZ-DQPSK optical signal. Two electrical signals (Tributaries) at the transmitter input are required with bit rate R (Gbit/s), and are pre-encoded in a particular way before being combined with a clock signal at frequency R/2. The obtained signals drive the optical modulator to obtain the desired optical format; the Mach-Zehnder modulator is biased at the maximum transmission point in order to obtain the desired RZ shaping. Carrier Suppressed RZ-DQPSK (CS) can also be obtained biasing the modulator at the minimum transmission point instead. The common CS technique consists in adding a periodical phase modulation to the pulse train, with π phase shift between adjacent bits.

The RZ-DQPSK signal generated using only one Mach-Zehnder modulator will be referred in the following as Single-Modulator Return-to-Zero Differential Quadrature Phase-Shift Keying (SM-RZ-DQPSK).

In another aspect of the present invention, two SM-RZ-DQPSK are polarization-time interleaved at the transmitter, the two signals having half-bit delay and orthogonal polarization between them. The obtained polarization-interleaved (PI) signal, referred in the following as PI-SM-RZ-DQPSK, requires 4 input tributaries with bit rate $R=1/T_B$ at the transmitter, and is characterized by a transport capacity of 4×R. (Gbit/s) and improved spectral efficiency.

The invention also relates to the optical communication systems including the SM-RZ-DPSK and PI-SM-RZ-DQPSK transmitters, to the methods for generating the said signals, and to the modulation devices usable for these methods and systems.

In the said aspects of the present invention, the generated signal spectral efficiency may overcome the value of 1.6 bit/s/Hz without the need of a polarization controller at the receiver. Signal at 10 Gbitis according to one aspect of the invention is able to reach a 300 km transmission distance of uncompensated standard monomodal fiber (SMF).

The purpose of the invention is the simplification of the RZ phase-shift keying transmitter scheme, using a single Mach-Zehnder modulator for both the optical phase modulation and the pulse shaping. A purpose is also the increase of the transmission distance [km], of the transmission capacity [bit/s] and the spectral efficiency [bit/s/Hz] in long-haul and in metropolitan optical transmission systems.

The SM-RZ-DQPSK transmitter, according to one aspect of the invention, optically multiplexes and de-multiplexes, in a single optical WDM channel, two electrical tributaries with bit rate R [Gbit/s] each. A single dual-drive modulator and electronics with electrical cut-off frequency comparable to R [GHz] is required at the transmitter to generate an optical channel with 2×R capacity.

The PI-SM-RZ-DQPSK transmitter, according to another aspect of the invention, optically multiplexes four tributaries with bit rate R each, requiring at the transmitter two dual-drive modulators and electronics with cut-off frequency comparable to R to transmit an optical channel with 4×R capacity.

BRIEF DESCRIPTION OF THE SEVERAL VIEWS OF THE DRAWING

The following figures illustrate better the present invention by way of example and without restrictions, detailed descriptions will be given in the following section.

DETAILED DESCRIPTION OF THE INVENTION

Figure 1:
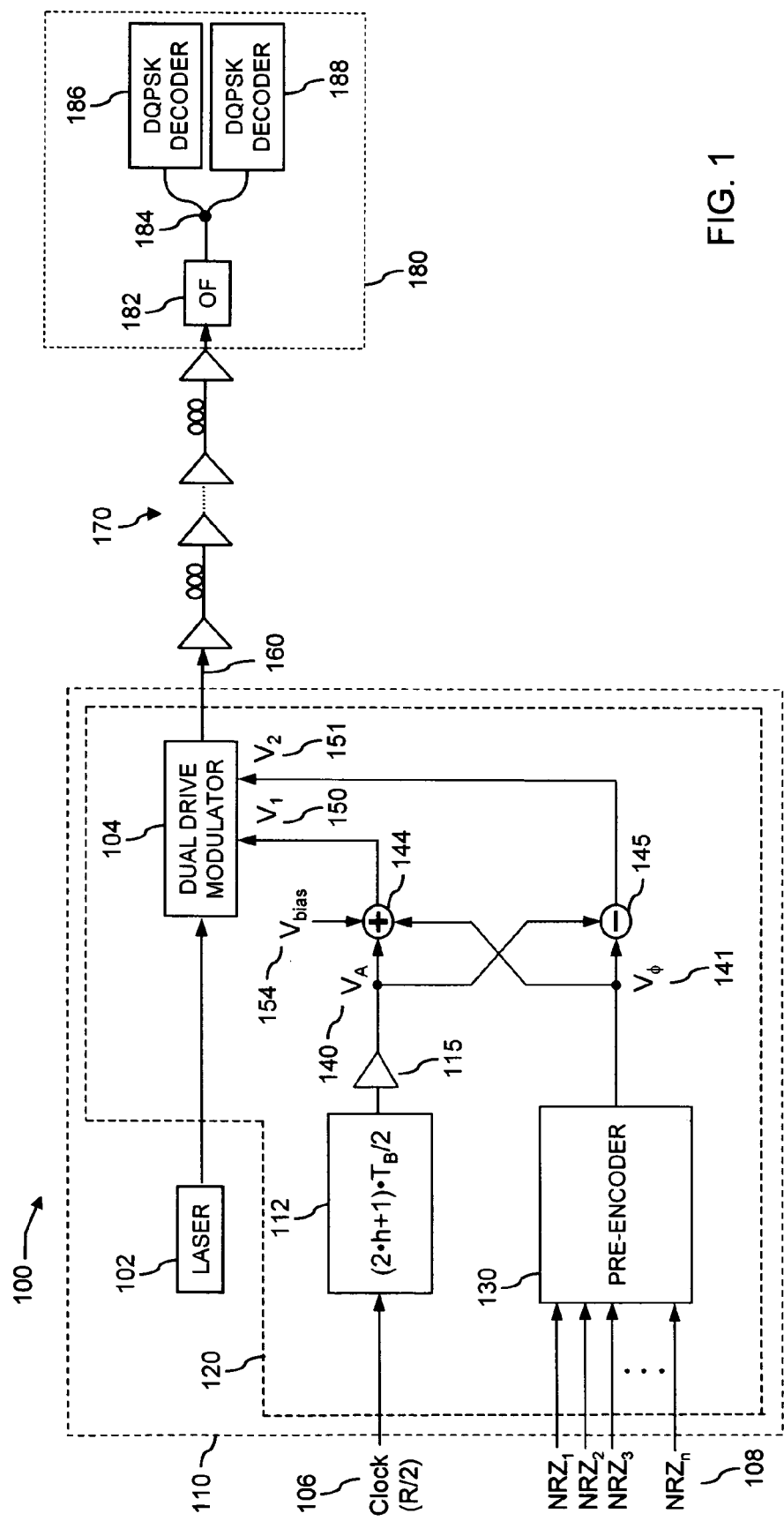
FIG. 1 illustrates a transmission system and a modulation device according to a first aspect of the present invention.

The scheme of FIG. 1 includes a device 120 for modulating a digital optical signal 160 according to a first aspect of the present invention, the said device 120 comprising:

a) an optical modulator with dual-drive design 104, having at input a substantially continuous flow of optical radiation, to modulate the optical power in the said optical signal 160 with a train of optical pulses with repetition rate R (GHz) and to simultaneously modulate the optical phase in the said optical signal 160 with a M-levels phase driving signal $V_\phi$ 141 at symbol rate R (Gsymbol/s) and symbol period $T_B=1/R$ (s), representative of $n=\log_2 M$ input binary electrical tributaries 108, having each the bit rate R. The optical radiation at the input of the said optical modulator 104 has typically a constant state of polarization;

b) a clock signal 106 at frequency R/2 (GHz), delayed by $(h+\frac{1}{2})T_B$, 112, respect to the said phase signal 141, being h an integer number, and suitably amplified to produce the amplitude driving signal $V_A$ 140;

c) an electrical pre-encoding circuit 130, having at input the n electrical tributaries 108, generating the M-ary phase driving signal $V_\phi$ 141;

d) electrical circuits to analogically add 144 and subtract 145 the said driving signals, according to the equations $$V_1(t)=V_A(t)+V_\phi(t)+V_{bias}$$

$$V_2(t)=-V_A(t)+V_\phi(t) \quad (1)$$

whereas $V_1$, $V_2$ and $V_{bias}$ are respectively the two driving voltages and the bias voltage applied to the modulator 104.

The said subtract circuit 145 may be implemented, for example, using an electrical amplifier that performs the multiplication $-1 \cdot V_A$, and an analogical adder circuit.

The said optical modulator 104 is for example of the conventional $LiNbO_3$ Mach-Zehnder Interferometric type (MZI); the dual-drive design is characterized by having two distinct electrodes where two driving voltages are separately applied. Generally, in the MZI modulator with dual-drive design the LiNbO$_3$ crystal orientation is z-cut, with the diffused optical waveguides positioned underneath the two "hot" electrodes (i.e. the electrodes where the two driving voltages are separately applied) instead of the ground electrodes. The modulator transfer function for the optical field is given by $$E_{out}(t)=E_{in}\cdot\cos(0.5\cdot\pi(V_1-V_2)/V_\pi)\cdot\exp(i\cdot0.5\cdot\pi\cdot(V_1+V_2)/V_\pi); \quad (2)$$

where $V_1$, $V_2$ are the applied driving voltages and $V_\pi$ the modulator inversion voltage. Equation 2 for a modulator with finite extinction ratio er becomes:

$$E_{out}(t)=E_{in}\cdot(0.5\cdot\exp(i\cdot\pi\cdot V_1/V_\pi)+0.5\cdot((\sqrt{er}-1)/(\sqrt{er}+1))\cdot\exp(i\cdot\pi\cdot V_2/V_\pi). \quad (3)$$

From equations 1 and 2 we observe that the voltage difference $V_1-V_2=2V_A+V_{bias}$ is able to shape the optical power, while the sum $V_1+V_2=2V_\phi+V_{bias}$ modulates the optical phase.

Figure 6:
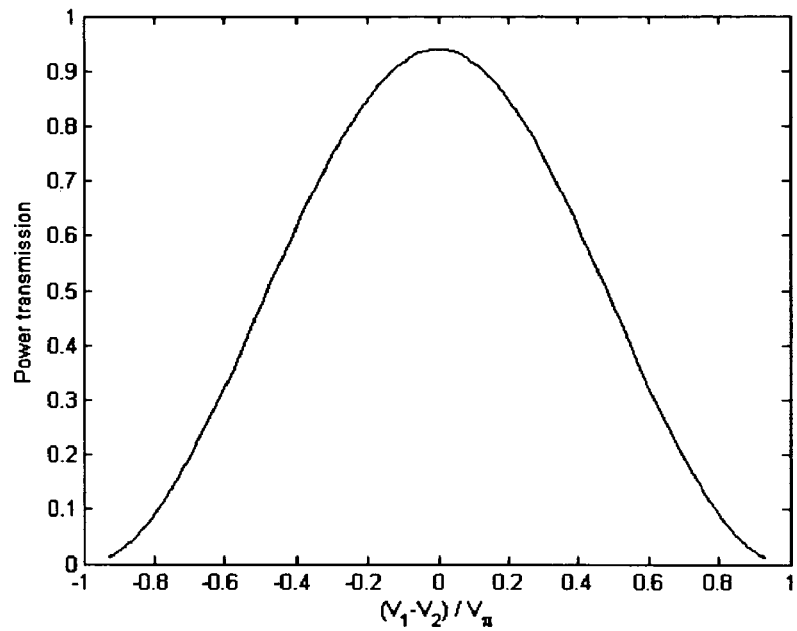
FIG. 6 illustrates the transfer function for the optical power and the phase of a Mach-Zehnder dual-drive modulator used in all the aspects of the invention.
Figure 6:
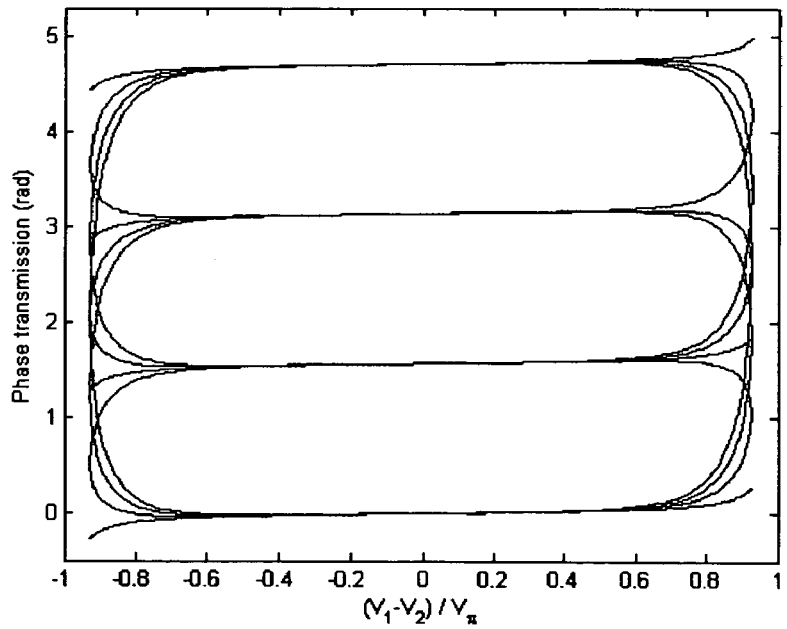

FIGS. 6a and 6b show respectively the optical power and the phase transfer functions for a dual-drive modulator biased at the maximum transmission point, i.e. for $V_{bias}=0$, in the case of a clock signal $V_A$ at frequency R/2 and voltage levels $\pm V_\pi/2$, and of a 4-level phase driving signal $V_\phi$. The transmitted optical power is a train of pulses according to the applied voltage difference $V_1-V_2=2V_A$; optical phase assumes one of four levels according to the value of the applied sum $V_1+V_2=2V_\phi$. The generated optical signal in this case has RZ-DQPSK format, provided a proper electrical pre-encoding 130 is performed.

The said clock signal 106 at frequency R/2 (GHz), is required to have proper rise and fall times, in order to produce optical pulses with optimal pulsewidth. Preferably, the said rise/fall times are approximately equal to 30% the clock period $2T_B$.

In the general case of M-ary phase, the n input tributaries 108 at bit rate R (Gbit/s) are preferably of type Non-Return-to-Zero (NRZ). The modulator 104 is conveniently biased at the maximum transmission point, setting for example $V_{bias}=0$. The said amplitude driver $V_A$ 140 is a binary signal at frequency R/2, preferably amplified 115 to the voltage levels $\pm V_\pi/2$. The said phase driver $V_\phi$ 141 is a M-level electrical signal at symbol rate R, preferably with uniformly distributed levels between $-V_\pi$ and $V_\pi$.

In a second aspect of the present invention, the scheme of FIG. 1 includes a device 120 for modulating a digital optical signal 160, the said device 120 comprising n=2 tributaries NRZ$_1$ and NRZ$_2$. The pre-encoder circuit 130 is required to generate a 4-level phase signal $V_\phi$ 141 suitable to be decoded by two DQPSK receivers.

The DQPSK decoder 186 commonly comprises an unbalanced Mach-Zehnder interferometer (MZI). At one arm of the MZI an optical delay equal to $p\cdot T_B$ is produced, with $T_B$ the incoming symbol period and p an integer number; at the other arm an optical phase shift of $\pi/4$ (for a first decoder) or $-\pi/4$ (for a second decoder) is imparted. The received j-th current samples at the output of the two DQPSK decoders will be proportional to $$I_1(jT_B)=\cos[\Phi_{opt}(jT_B)-\Phi_{opt}((j-p)T_B)+\pi/4]$$
$$I_2(jT_B)=\cos[\Phi_{opt}(jT_B)-\Phi_{opt}(j-p)T_B)-\pi/4], \quad (4)$$

with $\Phi_{opt}$ the received optical phase. Typically, the optical delay $p\cdot T_B$ at the decoder has p=1. Higher values for p may be used for simplifying the decoder implementation.

The described DQPSK decoder schemes are well known in literature and are not object of the present invention.

The electrical pre-encoder according to the second aspect of the invention must be able to encode the phase signal $V_{100}$ so that the received currents $I_1$, and $I_2$ are exact replica of the input tributaries NRZ$_1$ 208 and NRZ$_2$ 209. If $a_k$ and $b_k$ are the k-th bits (0 or 1) of the sequences NRZ$_1$ and NRZ$_2$ respectively, the logical operation to impose are $$E_k=((a_k\oplus E_{k-p})+O_{k-p})'+((b_k\oplus E_{k-p})+O_{k-p})'$$
$$O_k=((b_k\oplus O_{k-p})+a_k')'+((b_k\oplus O_{k-p})+a_k)'. \quad (5)$$

In eqs. 5, the symbols +, $\oplus$ and ' stand for logical OR, XOR and NOT respectively; $E_k$ and $O_k$ are commonly referred as encoded even and odd bits. The p delay in eqs. 5 must equal the one used at the decoders.

Figure 2:
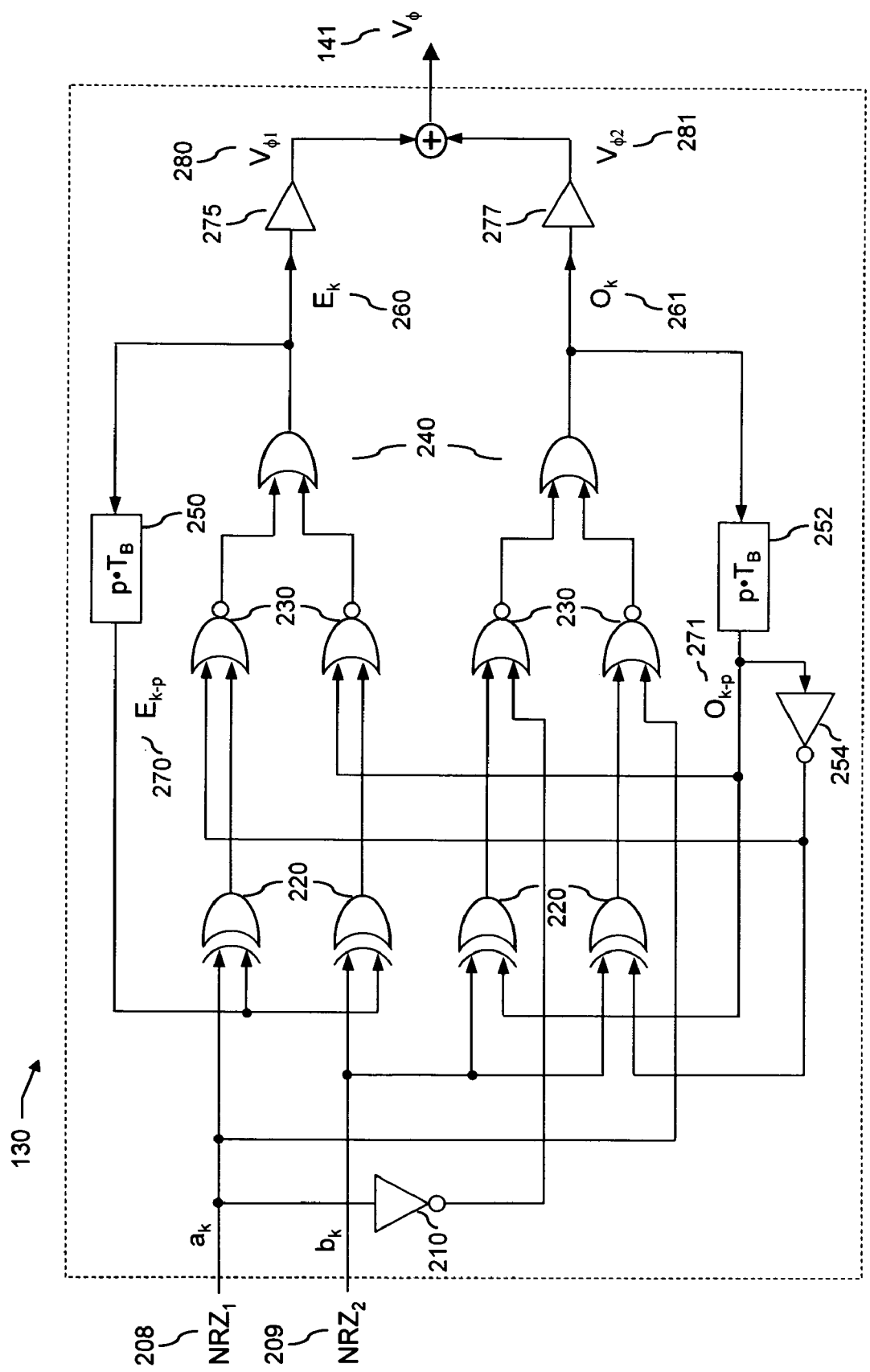
FIG. 2 illustrates a pre-encoder device according to a second aspect of the present invention, to be used into the modulation device of FIG. 1.

FIG. 2 includes a scheme of the said electrical pre-encoder circuit 130 for the said optical modulator 104, according to a first embodiment of the said device 120 for modulating a RZ-DQPSK optical signal, to be used in the systems and modulators according to the second aspect of the present invention, the said pre-encoder including, among the other things:

a) a first level of logical Exclusive-OR (XOR) gates 220 having at input the said first and second tributaries $a_k$ 208 and $b_k$ 209 and the encoded signals $E_{k-p}$ 270 and $O_{k-p}$ 271 delayed by p symbol periods $T_B$. The said logical XOR gates can be realized, for instance, through an integrated GaAs module;

b) a second level of logical NOR gates 230 having at input the said tributaries $a_k$ 208 and $b_k$ 209, the encoded signals $E_{k-p}$ 270 and $O_{k-p}$ 271 and the outputs of the first level gates;

c) a third level of OR gates 240 having at input the signals generated by second level gates 230;

d) two feedback circuits with delay lines $p\cdot T_B$ 250, 252;

e) two electrical buffers 275, 277 having at input the said encoded signals $E_k$ 260 and $O_k$ 261. The two buffers may include electrical delay lines and amplifiers, for the delay recovering and for generating the synchronous signals $V_{\phi 1}$ 280 and $V_{\phi 2}$ 281 with proper voltage amplitudes. Buffers may also be replaced by clocked gates like, for instance, D flip-flops;

f) an analogical adder circuit for generating the phase driving signal $V_\phi$ 141.

Conveniently, the voltage levels for the said signals $V_{\phi 1}$ 280 and $V_{\phi 2}$ 281 are $\pm V_{\pi/2}$ and $\pm V_{\pi/4}$.

Typically but not necessarily, the number of symbol periods for the said delay lines 250, 252 and for the DQPSK decoders is p=1.

Preferably, the electrical devices and logic gates used in the said electrical pre-encoder 130 have comparable or greater electrical bandwidth to that of the said input tributaries NRZ$_1$ 208 and NRZ$_2$ 209.

Typically, the electrical signals at the output of the DQPSK decoders are of the illustrated type in FIG. 5a, and are similar to those generated by a common RZ-DQPSK transmitter employing an intensity shaper modulator cascaded to a Mach-Zehnder super-structure (FIG. 5c).

Figure 7:
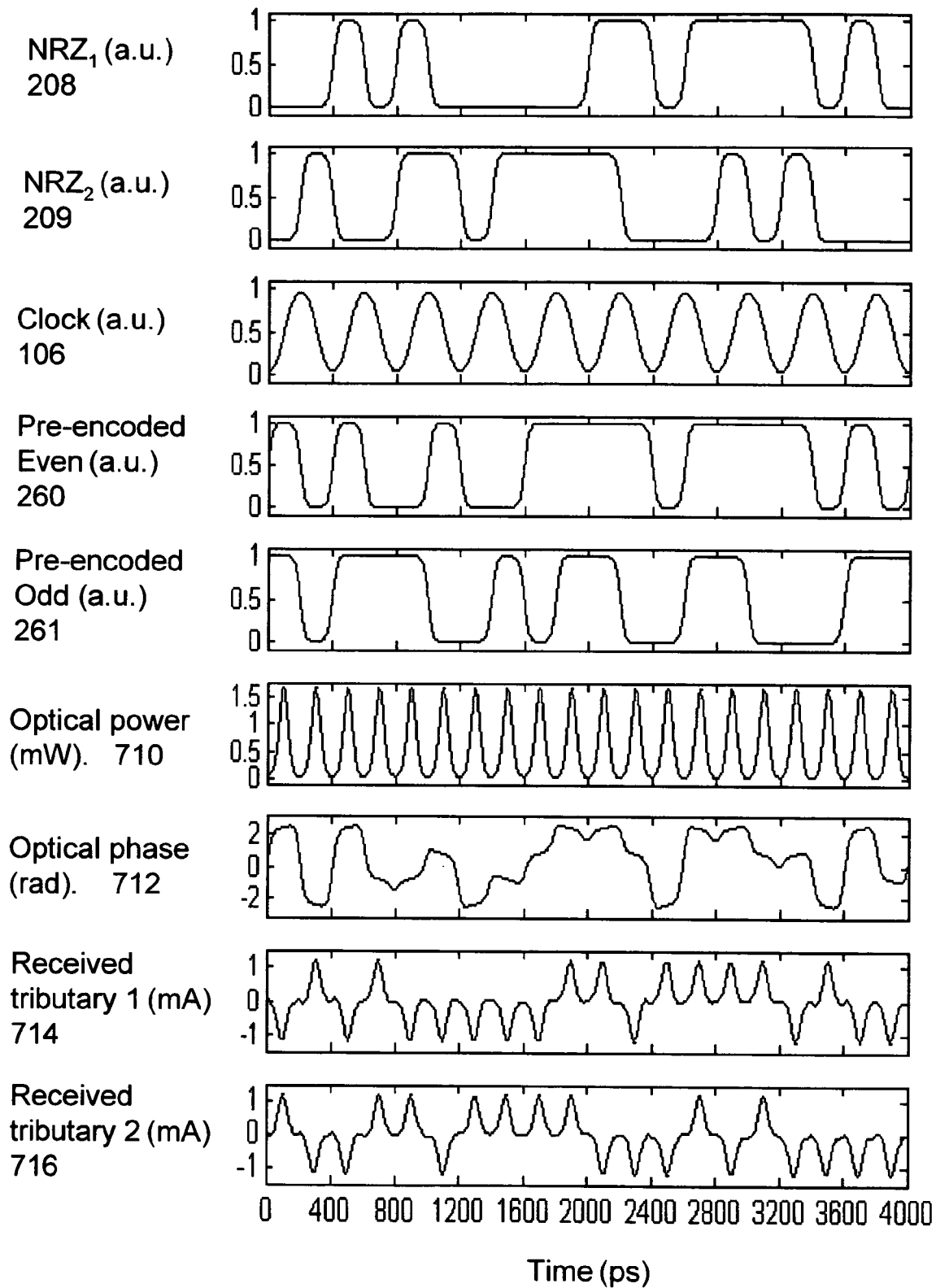
FIG. 7 shows an example of timing diagrams for the electrical and optical signals according to the second aspect of the invention.

FIG. 7 shows an example of the timing diagrams for the electrical and optical signals generated by a modulator according to a second aspect of the invention, in particular: two NRZ input tributaries 208, 209 are considered at 5 Gbit/s each. A clock 106 at 2.5 GHz is used for the optical pulse train generation 710; pre-encoded even 260 and odd 261 signals at 5 Gbit/s are elaborated using eqs. 5, and are used to modulate the optical phase 712. The electrical tributaries 714, 716 are obtained at the output of the DQPSK decoders 186, 188 with balanced detection, and reproduce the bit patterns of the input NRZ signals.

The optical modulation device according to the second aspect of the invention has the advantage to double the transport capacity and increase the tolerances to linear and non-linear effects in comparison to traditional NRZ or RZ systems, without necessarily broadening the optical signal bandwidth, thus increasing the system spectral efficiency [bit/s/Hz]. Both the optical power and phase are modulated using a single dual-drive modulator, reducing the transmitter complexity respect to the schemes proposed in the prior art.

The modulation format described by the second aspect of the present invention is referred here as Single-Modulator Return-to-Zero Differential Phase-Shift Keying (SM-RZ-DQPSK).

In a further embodiment (not shown) of the said device 120 for modulating a RZ-DQPSK optical signal, Carrier Suppressed SM-RZ-DQPSK is also feasible biasing the said modulator 104 at the minimum transmission point, setting for example $V_{bias}=V_\pi$, and omitting the said delay 112 for the clock signal 106 at frequency R/2 (GHz).

In a third aspect, the present invention relates to an optical communication system 100 comprising: a first apparatus 110 to transmit at least a digital optical signal 160 with SM-RZ-DQPSK format, an optical transmission line 170, optically connected to the said first apparatus 110, for the propagation of the said optical signal 160 and a second apparatus 180, optically connected to the said optical transmission line 170, to receive the said optical signal 160.

The said first apparatus 110 to transmit an optical signal 160 includes:
a) a laser light source 102, that furnishes a substantially continuous flow of optical radiation to the wavelengths typical of the optical communications, and preferably in the optical fiber third transmission window, in the region of 1500-1600 nm;
b) a SM-RZ-DQPSK modulator according to the second aspect of the invention, including a single optical modulator 104 with dual-drive design;
c) a pre-encoder circuit 130 suitable for RZ-DQPSK transmission, the said pre-encoder implementing the eqs. 5 already described in relation to the second aspect of the present invention.

The said optical transmission line 170 typically consists of optical fibers resulting monomodal at the transmission wavelength, for example of type NZ-DSF (Non-Zero Dispersion Shifted Fiber) or DS (Dispersion Shifted) or SMF (Standard Monomodal Fiber). The said optical transmission line 170 may also include optical amplifiers, for example of type EDFA (Erbium-Doped Fiber Amplifier) or Raman or of the semiconductor type, inserted in cascade every, for example, 80 km of optical fiber. The said optical transmission line 170 may also include other optical devices like, among the others, multiplexers and de-multiplexers for WDM signals, ADMs (Add-Drop Multiplexers), OXCs (Optical Cross Connects), optical and opto-electronic regenerators.

The said second apparatus 180 to receive the said optical signal 160 includes:
d) an optical filter 182 to select in frequency the said optical signal 160. The said optical filter 182 can be realized, for instance, through a WDM de-multiplexer of type AWG (Arrayed Waveguide Grating), a BG filter (Bragg Grating), and a Fabry Perot or Mach Zehnder interferometric filter;
e) a non-polarizing beam splitter 184 to split the said optical signal 160 and apply the two portions to two DQPSK decoders 186, 188. The said non-polarizing beam splitter 184, can be for example a 1×2 coupler in fused fiber or in waveguide;
f) two DQPSK decoders 186, 188 to properly detect the quaternary phase optical signal.

Figure 3:
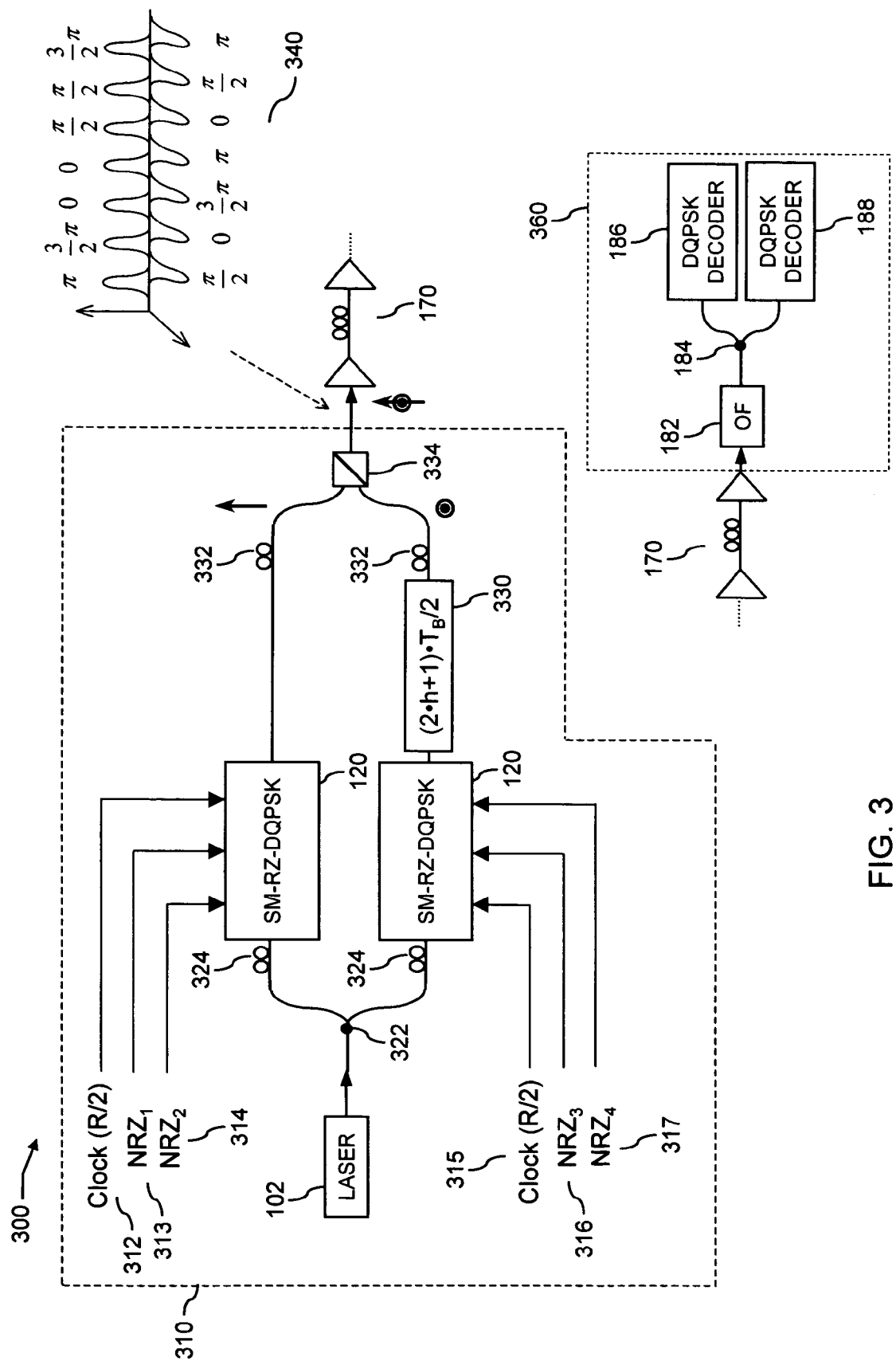
FIG. 3 illustrates a transmission system and a modulation device according to a fourth aspect of the present invention.

The scheme of FIG. 3 describes an apparatus 310 to transmit at least a digital optical signal 340 with polarization-time interleaved SM-RZ-DQPSK format, according to a fourth aspect of the present invention, the said apparatus including:
a) a laser light source 102, that furnishes a substantially continuous flow of optical radiation;
b) a beam splitter 322 to divide the said continuous flow in two portions; the said beam splitter 322 is characterized by a splitting ratio $\alpha$, defined as the ratio between the optical powers going to the following modulators 120; the said splitting ratio is preferably equal to 1;
c) two SM-RZ-DQPSK modulators 120 according to the second aspect of the invention, having at input the 4 tributaries 313, 314, 316, 317 with bit rate R (Gbit/s) and bit period $T_B=1/R$, and a clock 312, 315 at frequency R/2 (GHz), in order to obtain two phase modulated pulse sequences with SM-RZ-DQPSK or carrier suppress-SM-RZ-DQPSK format. The said tributaries are preferably of NRZ type ($NRZ_1$, $NRZ_2$, $NRZ_3$, $NRZ_4$);
d) an optical delay line 330, to delay one of the two phase modulated pulse trains by a time $(h+\frac{1}{2})T_B$, being h an integer number. The said delay line 330 may also be replaced by optical waveguides or fibers with different length at the input or output of the modulators 120;
e) a polarizing coupler 334 to recombine the obtained two pulsed sequences with orthogonal polarizations between them and temporally interleaved, the said coupler 334 having at output the said digital optical signal 340.

The pulse train 340 in FIG. 3 illustrates the said encoded digital optical signal 340 by way of example and without restrictions. The use of polarization preserving fibers or polarization controllers 324, 332 is generally needed to maintain the linear polarizations of the two pulse sequences at the output of the said modulators 120.

The said clock signal 312, 315 at frequency R/2 (GHz), is required to have proper rise and fall times, in order to produce optical pulses with optimal pulsewidth. Preferably, the said rise/fall times are approximately equal to 25%-30% the clock period $2T_B$.

Further characteristics of system in FIG. 3 have been described in relation to the second aspect of the present invention; for the details, reference should be made to the preceding text.

The modulation format described by the fourth aspect of the present invention is referred here as Polarization Interleaved Single-Modulator Return-to-Zero Differential Quadrature Phase-Shift Keying (PI-SM-RZ-DQPSK), because it is based substantially on the polarization-time interleaving of two SM-RZ-DQPSK or carrier suppress SM-RZ-DQPSK signals.

The said transmitter 310 commonly requires the same receiver as the one described for the SM-RZ-DQPSK format, including two DQPSK decoders 186, 188. Although the said PI-SM-RZ-DQPSK signal is based on a polarization interleaving, it must be emphasized that no polarization controller is needed at the receiver.

Typically, the electrical signals at the output of the two DQPSK decoders are of the illustrated type in FIG. 5b. Received eyes have characteristics similar to those of the SM-RZ-DQPSK case; any way, the two electrical binary output signals have bit rate 2×R (Gbit/s) each, and require time-domain de-multiplexing to extract the four tributaries $NRZ_1$, $NRZ_2$, $NRZ_3$, $NRZ_4$ at bit rate R.

The transmitter according to the said fourth aspect of the invention optically multiplexes 4 tributaries at bit rate R (Gbit/s) each, generating an optical channel with 4×R capacity.

By directly comparing the common RZ-DQPSK transmitter described in paper [R. A. Griffin, A. C. Carter, "Optical differential quadrature phase-shift key (oDQPSK) for high capacity optical transmission", OFC '02, vol. WX6, 2002] based on a Mach-Zehnder super-structure including 2 phase modulators, and on a further external intensity modulator to generate the RZ shaping, and the PI-SM-RZ-DQPSK transmitter according to the fourth aspect of the invention, we observe that the former requires 2 tributaries at bit rate 2×R at input, and 2 phase modulators and 1 shaper modulator with cut-off frequencies comparable to 2×R (GHz); the latter requires 4 tributaries at input at bit rate R, and 2 modulators with dual-drive design with cut-off frequency comparable to R. The receivers are on the contrary identical in the two cases, both in the scheme and the cut-off frequencies. PI-SM-RZ-DQPSK system thus shows a complexity comparable to that of the common RZ-DQPSK, but offers greatly improved performances, as it will be shown in the following section.

The optical communication systems using transmitters according to all the aspects of the present invention are typically used for the wavelength division multiplexing (WDM) transmission with high spectral efficiency. In a further embodiment (not shown), the said systems may include more apparatuses to transmit a plurality of optical signals 160 or 340 at different wavelengths, more apparatuses to receive the tributaries of the said optical signals, and conventional wavelength multiplexers and de-multiplexers to simultaneously transmit the said optical signals in the said transmission line 170.

In a fifth aspect, the present invention relates to a method for transmitting a digital optical signal 160 with return-to-zero phase-shift keying format, comprising the steps of:
a) modulating both the intensity and the phase of a substantially continuous flow of optical radiation, using a single optical modulator with dual-drive design 104, to produce a train of optical pulses with M-ary phase modulation in the said optical signal 160, being M an integer number;
b) the said train of optical pulses being generated using a clock signal at frequency R/2 (GHz), having repetition rate R, period $T_B=1/R$, and pulsewidth smaller than $T_B$;
c) the said M-ary phase modulation being representative of $n=\log_2 M$ encoded input tributaries with bit rate R (Gbit/s), characterized by a symbol rate R, symbol period $T_B=1/R$ and being synchronous to the said train of optical pulses.

Preferably, the phase levels assumed by the said M-ary phase modulation are distributed between 0 and $2\cdot\pi$ radians.

More preferably, the said phase levels equal $\phi_j=\phi_0+(j-1)\cdot 2\cdot\pi/M$, with $j=, 2, \ldots M$ and $\phi_0$ an arbitrary phase.

The said train of optical pulses can alternatively be of Carrier Suppressed RZ type, and the said optical signal of Carrier Suppressed RZ-PSK type.

In a second embodiment of the said method according to a fifth aspect of the present invention, a SM-RZ-DQPSK signal is generated, whereas the said number of input tributaries is n=2, and the optical phase assumes the four levels $\phi_j=\phi_0+(j-1)\cdot 2\cdot\pi/4$, with j=1, 2, 3, 4, the electrical pre-encoding 130 operation being given by $$E_k=((a_k\oplus E_{k-p})+O_{k-p})'+((b_k\oplus E_{k-p})+O_{k-p})'$$

$$O_k=((b_k\oplus O_{k-p})+a_k)'+((b_k\oplus O_{k-p}')+a_k)', \quad (6)$$

with $a_k$ and $b_k$ the k-th bits of the input tributary sequences $NRZ_1$ and $NRZ_2$ respectively.

In a further embodiment of the said method according to a fifth aspect of the present invention, two SM-RZ-DQPSK optical signals are generated, the said first and second optical signals being polarization-time interleaved with orthogonal polarizations between them and delayed in time by approximately $(h+\frac{1}{2})T_B$, being h an integer number.

In all the aspects of the present invention, the optical connections among the said laser source and optical modulators are for instance implemented through the use of polarization maintaining optical fibers, or by fiber polarization controllers, to maintain a constant state of polarization at the modulator input.

Figure 4:
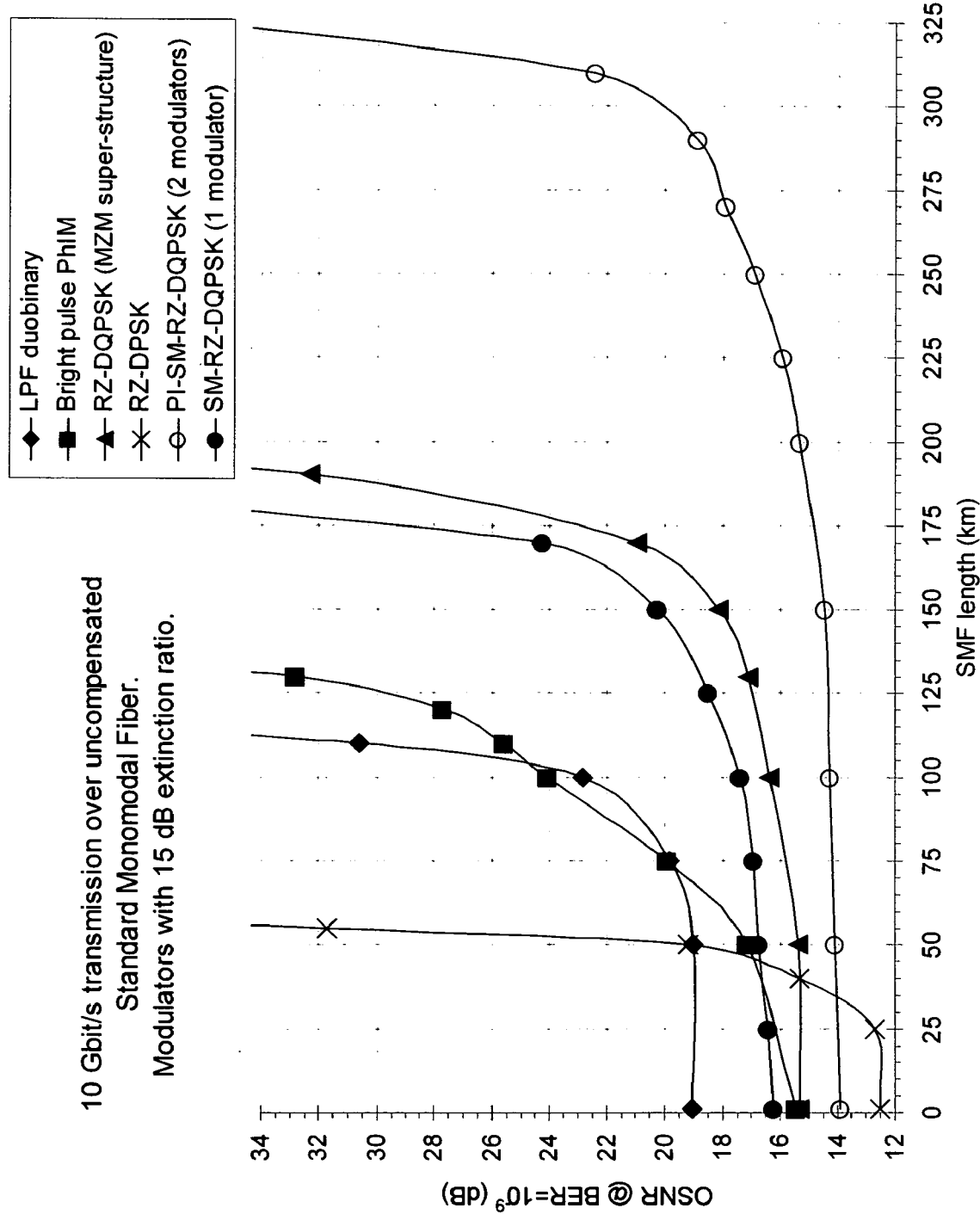
FIG. 4 reports an example of performances numerically evaluated for the transmission over an uncompensated span of standard monomodal fiber (SMF) according to the second and fourth aspect of the present invention.
Figure 5:
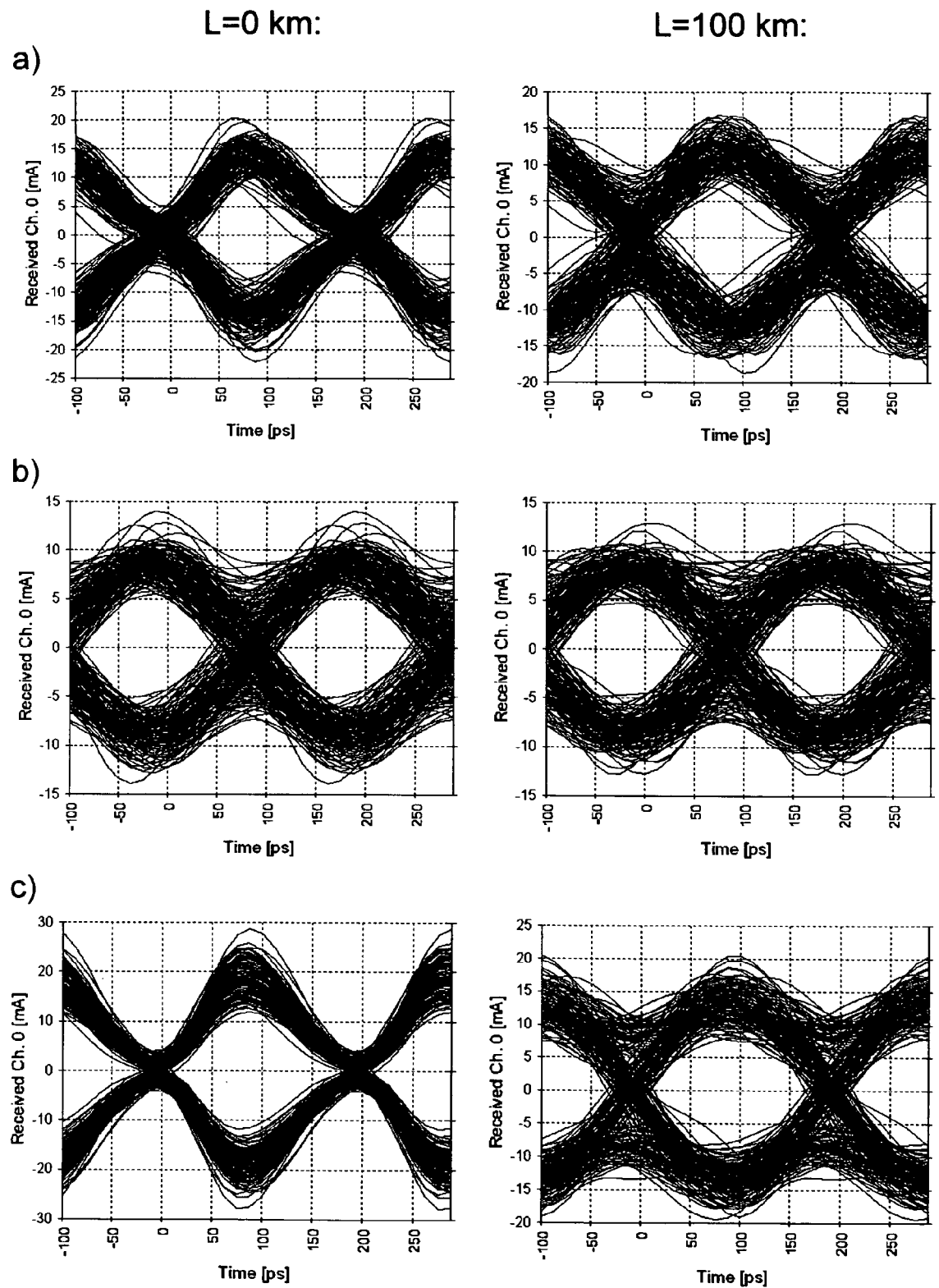
FIG. 5 shows some eye diagrams numerically evaluated for systems of the type of FIG. 1-2 and FIG. 3.

Detailed description of FIG. 4 and FIG. 5 is postponed to the text below.

Numerical Results

Extensive numerical simulations have been performed in order to compare the performances of the transmitters according to the present invention to the prior art. Transmission over an uncompensated span of Standard Monomodal Fiber (SMF) has been studied to test the tolerances to chromatic dispersion of the most advanced and promising modulation formats in the literature.

Simulations have been performed using a commercial software (Optolink Numerics). The model used for the transmission line 170 is the nonlinear Schrodinger equation in its most general vectorial form, numerically integrated through the well-known Fourier beam propagation method (BPM). The models for the system physical effects have been chosen among the most accurate in the literature, including: group velocity dispersion (GVD) of second and third order, optical Kerr and Raman nonlinearity, fiber birefringence, polarization mode dispersion (PMD), linear attenuation, amplified spontaneous emission (ASE) noise in the optical amplifiers, the models for the optical and opto-electronic components with their finite bandwidths.

Several modulation formats have been considered at the transmission rate of 10 Gbit/s; in particular:

Low-Pass Filter (LPF) duobinary [T. Ono, Y. Yano, K. Fukuchi, T. Ito, H. Yamakazi, M. Yamaguchi, K. Emura, "Characteristics of optical duobinary signals in terabit/s capacity, high-spectral efficiency WDM systems", J. Lightwave Technology, vol. 16, pp. 788-797, May 1998] at 10 Gbit/s. The electrical input tributary is a NRZ signal with 80 ps rise time; transmitter includes two 4th order Bessel filters with 2.8 GHz cut-off frequency and a dual-drive optical modulator with 15 dB extinction ratio. Receiver is a PIN photodiode with a 7.5 GHz Bessel front-end filter.

Bright-pulse PhIM [M. Zitelli, "Improved optical transmitters for pulsed phase and intensity modulation", Optics Express, vol. 13, pp. 1215-1220, February 2005] at 2×5 Gbit/s. Transmitter includes a shaper modulator generating a train of Gaussian pulses with 50 ps width, an intensity modulator with 15 dB extinction ratio and no chirp and a phase modulator to generate the 5 Gbit/s amplitude and phase tributaries. Receiver includes a PIN photodiode and a DPSK receiver with 3.75 GHz cut-off frequency front-ends.

RZ-DQPSK with Mach-Zehnder super-structure [R. A. Griffin, R. I. Johnston, R. G. Walker, J. Hall, S. D. Wadsworth, K. Berry, A. C. Carter, M. J. Wale, P. A. Jerram, N. J. Parsons, "10 Gbit/s optical differential quadrature phase shift key (DQPSK) transmission using GaAs/AlGaAs integration", proc. of OFC '02, postdeadline paper FD6, 2002] at 2×5 Gbit/s. The transmitter generates a train of Gaussian pulses at 5 GHz repetition rate, with 66 ps width and 15 dB extinction ratio. Pulses are phase modulated into a 4 level signal by 2 phase modulators with pre-encoded binary drivers. Receiver is composed by two DQPSK decoders with 3.75 GHz Bessel front-end filters.

RZ-DPSK [T. Miyano, F. Fukutoku, K. Hattori, H. Ono, "Suppression of degradation induced by SPM/XPM+GVD in WDM transmission using bit-synchronous intensity modulated DPSK" proc. of OECC '00, vol. 14D3, 2000] at 10 Gbit/s. Transmitter generates a train of Gaussian pulses at 10 GHz repetition rate, with 33 ps width and 15 dB extinction ratio, which are phase modulated by a differentially pre-encoded binary signal. Receiver is a DPSK decoder with 7.5 GHz Bessel front-end.

PI-SM-RZ-DQPSK at 4×2.5 Gbit/s. Two SM-RZ-DQPSK signals are polarization-time interleaved according to the scheme in FIG. 3. The modulator 120 in FIG. 1 is characterized by 210 ps rise and fall times for the clock signal 140, and 120 ps for the NRZ tributaries and the phase driver 141; dual-drive modulator 104 has 15 dB extinction ratio; the pre-encoder has the scheme in FIG. 2. Receiver is identical to the one used for the RZ-DQPSK case, with two DQPSK decoders and 3.75 GHz Bessel front-ends; the two outcoming 5 Gbit/s received binary signals are sampled at 2.5 GHz to extract the 4 tributaries.

SM-RZ-DQPSK at 2×5 Gbit/s. The transmitter in FIG. 1 is used with 2 NRZ tributaries and the pre-encoder in FIG. 2. Rise/fall times for the clock signal 140 and the phase driver 141 are 120 and 60 ps respectively; a dual-drive modulator with 15 dB extinction ratio is used. Receiver is composed by two DQPSK decoders with 3.75 GHz Bessel front-ends.

Transmission line is composed by a SMF span of variable length with 2 erbium-doped fiber amplifiers at input and output; no dispersion compensation is performed; an optical attenuator is added at input to obtain the desired optical signal-to-noise ratio (OSNR). Receiver also includes an optical filter with trapezoidal shape and 70 GHz bandwidth. FIG. 4 shows the OSNR over 0.1 nm bandwidth required to obtain received tributaries with $10^{-9}$ bit error rate (BER) at several fiber lengths. According to the figure, a convenient choice to extend the transmission over more than 150 km of uncompensated fiber is the RZ-DQPSK format.

The proposed SM-RZ-DQPSK transmitter offers results comparable to the common RZ-DQPSK transmitter with MZM super-structure; any way it requires a single dual-drive modulator instead of 2 phase modulators and a shaper.

The proposed PI-SM-RZ-DQPSK transmitter shows greatly improved tolerances to chromatic dispersion, almost doubling the reach respect to other DQPSK formats. The transmitter complexity is limited to 2 dual-drive modulators with 2 GHz cut-off frequency for operating at 4×2.5 Gbit/s, against the 2 phase modulators at 5 GHz and the shaper modulator required for the MZM super-structure at 2×5 Gbit/s.

FIG. 5 shows the received eyes after 0 km and 100 km of SMF length and at OSNR suitable to obtain BER=$10^{-9}$; eyes are given for: a) SM-RZ-DQPSK, b) PI-SM-RZ-DQPSK, c) RZ-DQPSK with MZM super-structure. All three cases show similar eyes (SM-RZ-DQPSK format is very close to common RZ-DQPSK); PI-SM-RZ-DQPSK requires the time de-multiplexing of the received eyes in order to extract the input 2.5 Gbit/s tributaries.

Several changes and adaptations may be made to the present invention by persons with skill in the art. Therefore, the scope of the invention is defined by the appended claims and all changes and modifications falling within the equivalence of the scope of the claims are to be embraced by the invention.

I claim:

1. A device 120 for modulating a digital optical signal 160, said device 120 comprising:
    a) an optical modulator with dual-drive design 104, having at input a substantially continuous flow of optical radiation, to modulate the optical power in said optical signal 160 with a train of optical pulses with repetition rate R (GHz) and to simultaneously modulate the optical phase in said optical signal 160 with a M-levels phase driving signal $V_\phi$ 141 at symbol rate R (Gsymbol/s) and symbol period $T_B=1/R$ (s), representative of $n=\log_2 M$ input binary electrical tributaries 108, having each the bit rate R,
    b) a clock signal 106 at frequency R/2 (GHz), delayed by $(h+\frac{1}{2})T_B$, respect to said phase signal 141, being h an integer number, and suitably amplified to produce the amplitude driving signal $V_A$ 140,
    c) an electrical pre-encoding circuit 130, having at input the n electrical tributaries 108, generating the M-ary phase driving signal $V_\phi$ 141,
    d) electrical circuits to analogically add 144 and subtract 145 said driving signals, according to the equations $$V_1(t)=V_A(t)+V_\phi(t)+V_{bias}$$

$$V_2(t)=-V_A(t)+V_\phi(t) \qquad (7)$$

whereas $V_1$, $V_2$ and $V_{bias}$ are respectively the two driving voltages and the bias voltage applied to the modulator 104.

2. A device 120 for modulating a digital optical signal 160 according to claim 1, characterized in that said tributaries 108 are of type Non-Return-to-Zero (NRZ).

3. A device 120 for modulating a digital optical signal 160 according to claim 2, characterized in that said amplitude driving signal $V_A$ 140 at frequency R/2 (GHz) assumes the voltage levels $\pm V_\pi/2$.

4. A device 120 for modulating a digital optical signal 160 according to claim 3, characterized in that said phase driving signal $V_\phi$ 141 at symbol rate R assumes M uniformly distributed levels between $-V_\pi$ and $V_\pi$.

5. A device 120 for modulating a digital optical signal 160 according to claim 4, characterized in that said modulator 104 is biased at the maximum transmission point, with $V_{bias}=0$.

6. A device 120 for modulating a digital optical signal 160, said device 120 comprising:
    a) an optical modulator with dual-drive design 104, having at input a substantially continuous flow of optical radiation, to modulate the optical power in said optical signal 160 with a train of optical pulses with repetition rate R (GHz) and to simultaneously modulate the optical phase in said optical signal 160 with a 4-levels phase driving signal $V_\phi$ 141 at symbol rate R (Gsymbol/s) and symbol period $T_B=1/R$ (s), representative of 2 input binary electrical tributaries 208, 209 having each the bit rate R,
    b) a clock signal 106 at frequency R/2 (GHz), delayed by $(h+\frac{1}{2})T_B$, respect to said phase signal 141, being h an integer number, and suitably amplified to produce the amplitude driving signal $V_A$ 140,
    c) an electrical pre-encoding circuit 130, having at input the 2 electrical tributaries 208, 209, generating the quaternary phase driving signal $V_\phi$ 141 suitable to be decoded by two DQPSK receivers,
    d) electrical circuits to analogically add 144 and subtract 145 said driving signals, according to the equations $$V_1(t) = V_A(t) + V_\phi(t) + V_{bias}$$

$$V_2(t) = -V_A(t) + V_\phi(t) \quad (7)$$

whereas $V_1$, $V_2$ and $V_{bias}$ are respectively the two driving voltages and the bias voltage applied to the modulator 104.

7. A device 120 for modulating a digital optical signal 160 according to claim 6, characterized in that said tributaries 208, 209 are of type Non-Return-to-Zero (NRZ).

8. A device 120 for modulating a digital optical signal 160 according to claim 7, characterized in that said amplitude driving signal $V_A$ 140 at frequency R/2 (GHz) assumes the voltage levels $\pm V_\pi/2$.

9. A device 120 for modulating a digital optical signal 160 according to claim 8, characterized in that said phase driving signal $V_\phi$ 141 at symbol rate R is the sum of two binary signals $V_{\phi 1}$ 280 and $V_{\phi 2}$ 281 at bit rate R, assuming the voltage levels $\pm V_\pi/2$ and $\pm V_\pi/4$ respectively.

10. A device 120 for modulating a digital optical signal 160 according to claim 9, characterized in that said electrical pre-encoder 130 elaborates the input tributaries 208, 209 according to the logical equations $$E_k = ((a_k \oplus E_{k-p}) + O_{k-p}')' + ((b_k \oplus E_{k-p}) + O_{k-p}')'$$

$$O_k = ((b_k \oplus O_{k-p}) + a_k')' + ((b_k \oplus O_{k-p}') + a_k)', \quad (8)$$

with $a_k$ and $b_k$ the k-th bits (0 or 1) of the sequences $NRZ_1$ 208 and $NRZ_2$ 209 respectively, and $E_k$ 260, $O_k$ 261 the pre-encoded even and odd bits.

11. A device 120 for modulating a digital optical signal 160 according to claim 10, characterized in that said electrical pre-encoder 130 comprises:
  a) a first level of logical Exclusive-OR (XOR) gates 220 having at input said first and second tributaries $a_k$ 208 and $b_k$ 209 and the encoded signals $E_{k-p}$ 270 and $O_{k-p}$ 271 delayed by p symbol periods $T_B$,
  b) a second level of logical NOR gates 230 having at input said tributaries $a_k$ 208 and $b_k$ 209, the encoded signals $E_{k-p}$ 270 and $O_{k-p}$ 271 and the outputs of the first level gates 220,
  c) a third level of OR gates 240 having at input the signals generated by second level gates 230,
  d) two feedback circuits with delay lines $p \cdot T_B$ 250, 252,
  e) two electrical buffers 275, 277 having at input said encoded signals $E_k$ 260 and $O_k$ 261, for generating the synchronous signals $V_{\phi 1}$ 280 and $V_{\phi 2}$ 281 with proper voltage amplitudes,
  f) an analogical adder circuit for generating the phase driving signal $V_\phi$ 141.

12. A device 120 for modulating a digital optical signal 160 according to claim 10, characterized in that said number of symbol periods for the delay 250, 252 of the encoded even and odd bits is p=1.

13. A device 120 for modulating a digital optical signal 160 according to claim 10, characterized in that said modulator 104 is biased at the maximum transmission point, with $V_{bias}=0$.

14. An optical communication system 100 comprising:
  a first apparatus 110 to transmit at least a digital optical signal 160 with SM-RZ-DQPSK format, including:
    a) a laser light source 102, that furnishes a substantially continuous flow of optical radiation,
    b) a SM-RZ-DQPSK modulator according to claim 13, including a single optical modulator 104 with dual-drive design,
    c) a pre-encoder circuit 130 suitable for RZ-DQPSK transmission;
  an optical transmission line (170), optically connected to said first apparatus (110), for the propagation of said optical signal (160);
  a second apparatus (180), optically connected to said optical transmission line (170), to receive said optical signal (160), said second apparatus (180) comprising:
    d) an optical filter (182) to select in frequency said optical signal (160),
    e) a non-polarizing beam splitter 184 to split said optical signal 160 and apply the two portions to two DQPSK decoders 186, 188,
    f) two DQPSK decoders 186, 188 to properly detect the quaternary phase optical signal.

15. An apparatus 310 to transmit at least a digital optical signal 340 with polarization-time interleaved SM-RZ-DQPSK format, including:
  a) a laser light source 102, that furnishes a substantially continuous flow of optical radiation,
  b) a beam splitter 322 to divide said continuous flow in two portions,
  c) two SM-RZ-DQPSK modulators 120 according to claim 13, having at input the 4 tributaries 313, 314, 316, 317 with bit rate R (Gbit/s) and bit period $T_B=1/R$, and a clock 312, 315 at frequency R/2 (GHz), in order to obtain two phase modulated pulse sequences with SM-RZ-DQPSK format,
  d) an optical delay line 330, to delay one of the two phase modulated pulse trains by a time $(h+\frac{1}{2})T_B$, being h an integer number,
  e) a polarizing coupler 334 to recombine the two obtained pulsed sequences with orthogonal polarizations between them and temporally interleaved, said coupler 334 having at output said digital optical signal 340.

16. A method for transmitting a digital optical signal 160 with return-to-zero phase-shift keying format, comprising the steps of:
  a) modulating both the intensity and the phase of a substantially continuous flow of optical radiation using a single optical modulator with dual-drive design 104, to produce a train of optical pulses with M-ary phase modulation in said optical signal 160, being M an integer number,
  b) said train of optical pulses being generated using a clock signal 106 at frequency R/2 (GHz), having repetition rate R, period $T_B=1/R$, and pulsewidth smaller than $T_B$,
  c) said M-ary phase modulation assuming phase levels distributed between 0 and $2\cdot\pi$ radians, being representative of $n=\log_2 M$ encoded input tributaries 108 with bit rate R (Gbit/s), having symbol rate R, symbol period $T_B=1/R$ and being synchronous to said train of optical pulses,
  d) obtaining said modulator 104 driving voltages 150, 151 by the analogical operations $$V_1(t) = V_A(t) + V_\phi(t) + V_{bias}$$

$$V_2(t) = -V_A(t) + V_\phi(t), \quad (9)$$

with $V_A$ 140 and $V_\phi$ 141 respectively the amplitude and phase driving signals, and $V_{bias}$ the modulator bias voltage.

17. A method for transmitting a digital optical signal 160 according to claim 16, characterized in that said amplitude driving signal $V_A$ 140 assumes voltage levels equal to $\pm V_\pi/2$.

18. A method for transmitting a digital optical signal 160 according to claim 17, characterized in that said input tributaries 208, 209 are in number of n=2 with Non-Return-to-Zero (NRZ) format, and said optical phase assumes the four levels $\phi_j=\phi_0+(j-1)\cdot 2\cdot\pi/4$, with j=1, 2, 3, 4 and $\phi_0$ an arbitrary phase (radians).

19. A method for transmitting a digital optical signal 160 according to claim 18, characterized in that the phase signals $V_{\phi 1}$ 280 and $V_{\phi 2}$ 281 assume voltage levels equal to $\pm V_\pi/2$ and $\pm V_\pi/4$ respectively.

20. A method for transmitting a digital optical signal 160 according to claim 19, characterized in that said input tributaries 208, 209 are pre-encoded by the logical operations $$E_k=((a_k\oplus E_{k-p})+O_{k-p}')'+((b_k\oplus E_{k-p})+O_{k-p})'$$

$$O_k=((b_k\oplus O_{k-p})+a_k')'+((b_k\oplus O_{k-p}')+a_k)', \qquad (10)$$

with $a_k$ and $b_k$ the k-th bits of the input tributary sequences.

21. A method for transmitting a digital optical signal 160 according to claim 20, characterized in that said modulator 104 is biased at the maximum transmission point, with bias voltage 154 $V_{bias}=0$.

22. A method for transmitting a digital optical signal 160 according to claim 20, characterized in that said modulator 104 is biased at the minimum transmission point, with bias voltage 154 $V_{bias}=V_\pi$, and the obtained optical signal has carrier suppressed SM-RZ-DQPSK format.

23. A method for transmitting a digital optical signal 340 according to claim 20, characterized in that said steps of modulating with SM-RZ-DQPSK format, using a single modulator with dual-drive design, are applied over two substantially continuous flows of optical radiation with linear polarization, and the obtained modulated optical signals are recombined with orthogonal polarizations between them and interleaved in time.

* * * * *